(No Model.)  4 Sheets—Sheet 1.

A. B. FOWLER.
BURNISHING AND TRIMMING MACHINE.

No. 352,864.  Patented Nov. 16, 1886.

Witnesses:
Charles B Elder
Charles H. Fogg.

Inventor:
Alfred B. Fowler
by Mban Andrew
his atty.

N. PETERS, Photo-Lithographer, Washington, D. C.

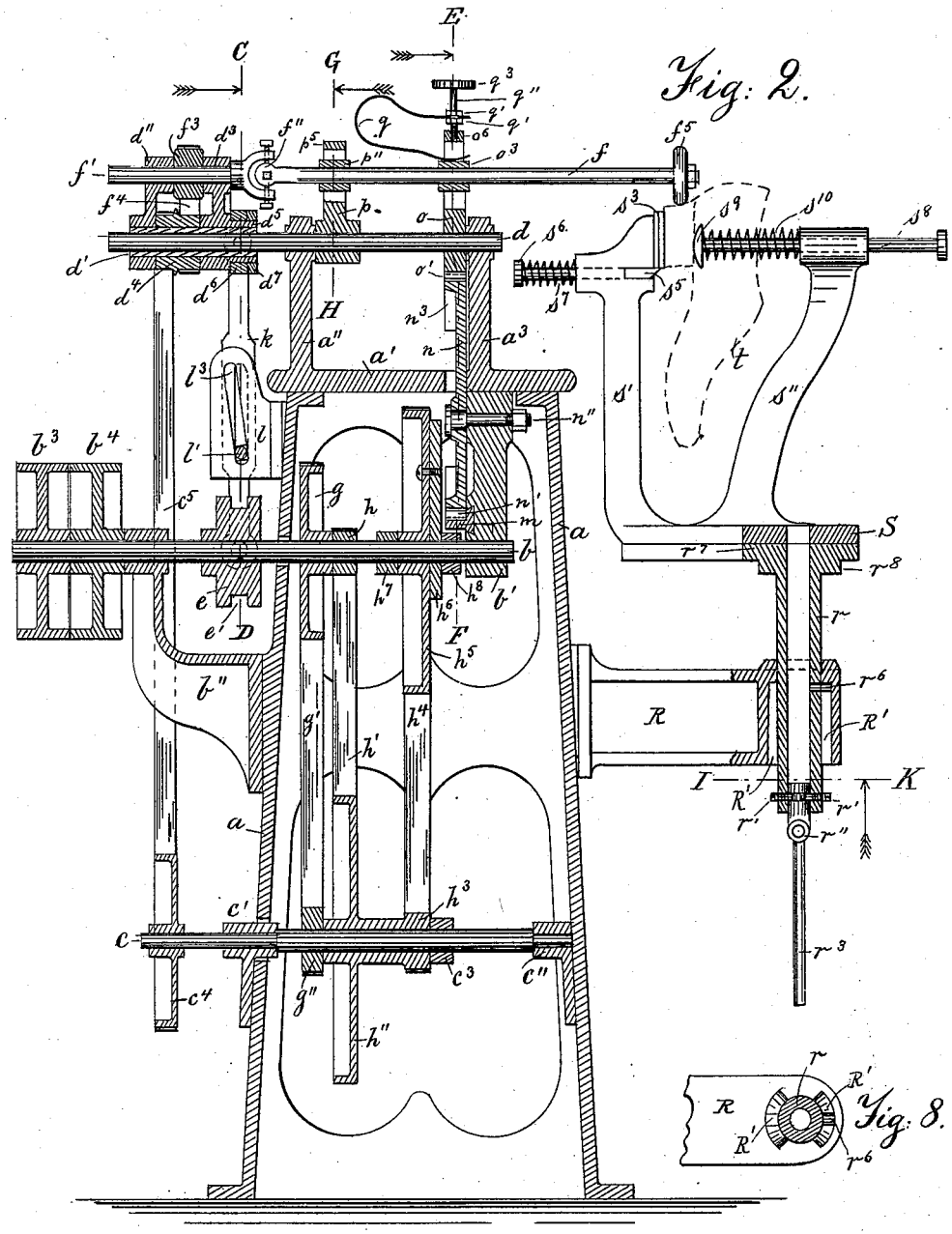

(No Model.) 4 Sheets—Sheet 3.

A. B. FOWLER.
BURNISHING AND TRIMMING MACHINE.

No. 352,864. Patented Nov. 16, 1886.

Witnesses:
Charles R. Elder
Charles H. Fogg.

Inventor:
Alfred B. Fowler
by Alban Andrew, his atty.

(No Model.) 4 Sheets—Sheet 4.
A. B. FOWLER.
BURNISHING AND TRIMMING MACHINE.
No. 352,864. Patented Nov. 16, 1886.
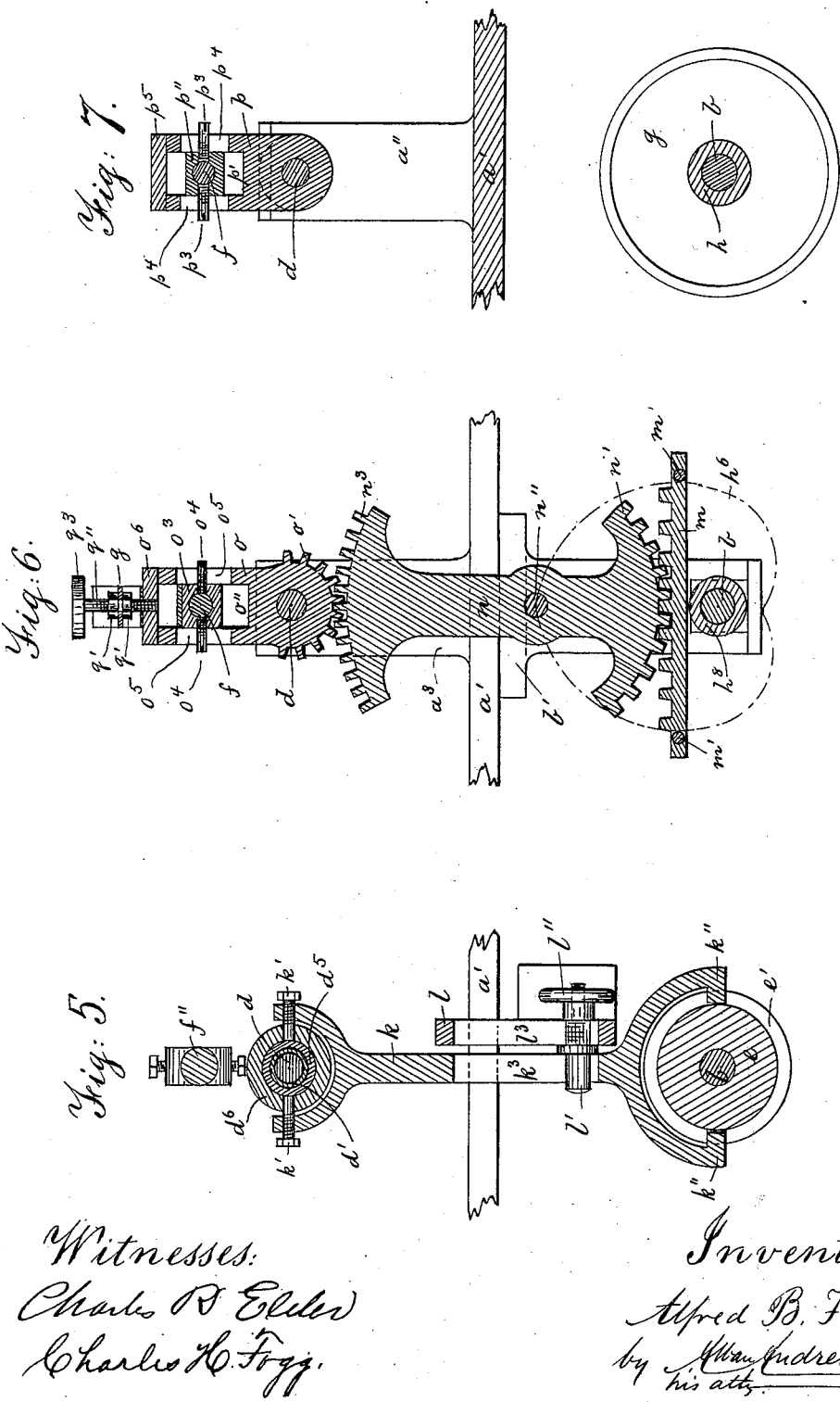

UNITED STATES PATENT OFFICE.

ALFRED B. FOWLER, OF EXETER, NEW HAMPSHIRE, ASSIGNOR TO THE ROCKINGHAM MACHINE COMPANY.

BURNISHING AND TRIMMING MACHINE.

SPECIFICATION forming part of Letters Patent No. 352,864, dated November 16, 1886.

Application filed July 26, 1886. Serial No. 209,052. (No model.)

*To all whom it may concern:*

Be it known that I, ALFRED B. FOWLER, a citizen of the United States, and a resident of Exeter, in the county of Rockingham and State of New Hampshire, have invented new and useful Improvements in Burnishing and Trimming Machines, of which the following, taken in connection with the accompanying drawings, is a specification.

This invention relates to improvements in boot and shoe burnishing and trimming machines, and it is carried out as follows, reference being had to the accompanying drawings, where—

Figure 1:
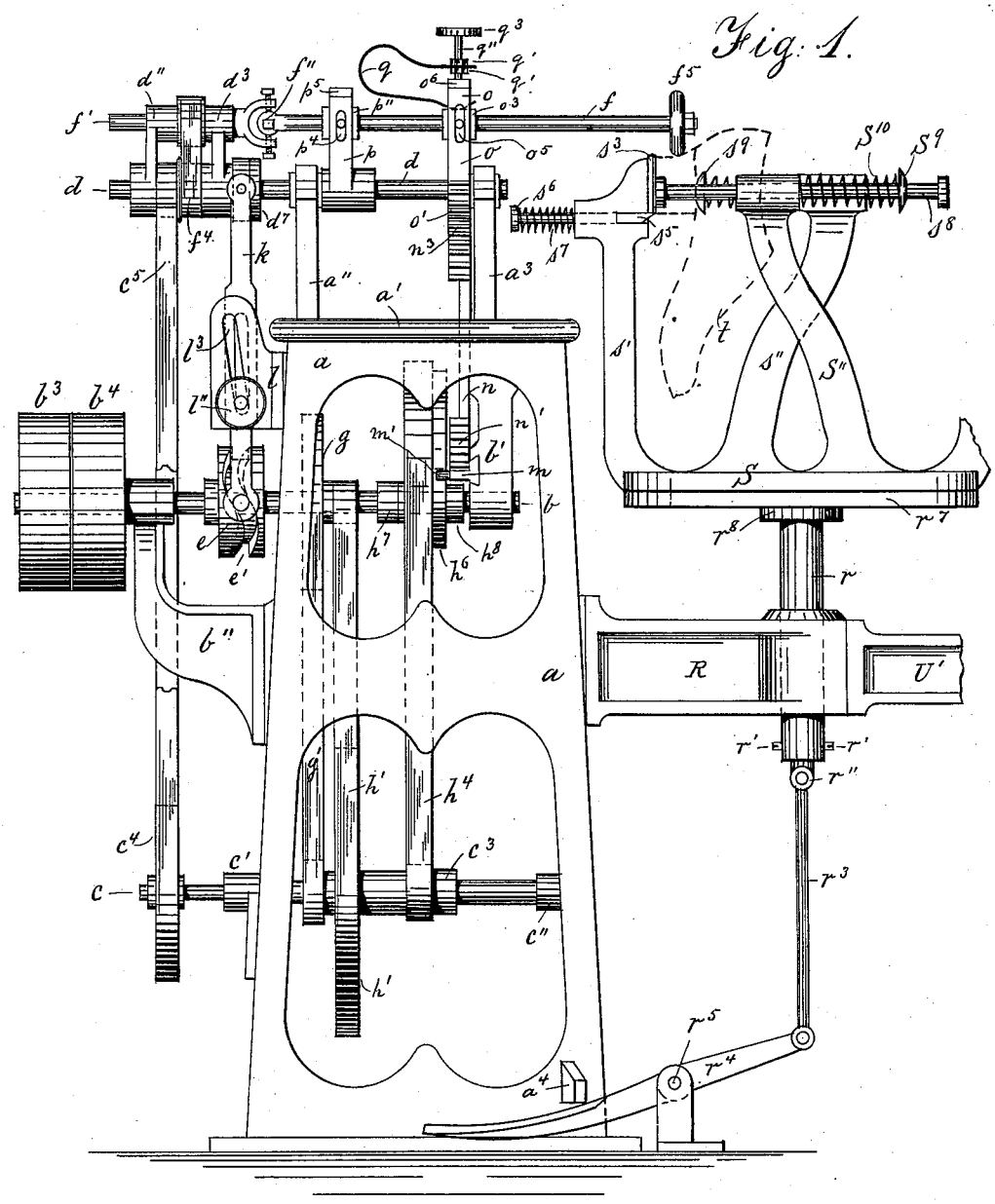
Figure 4:
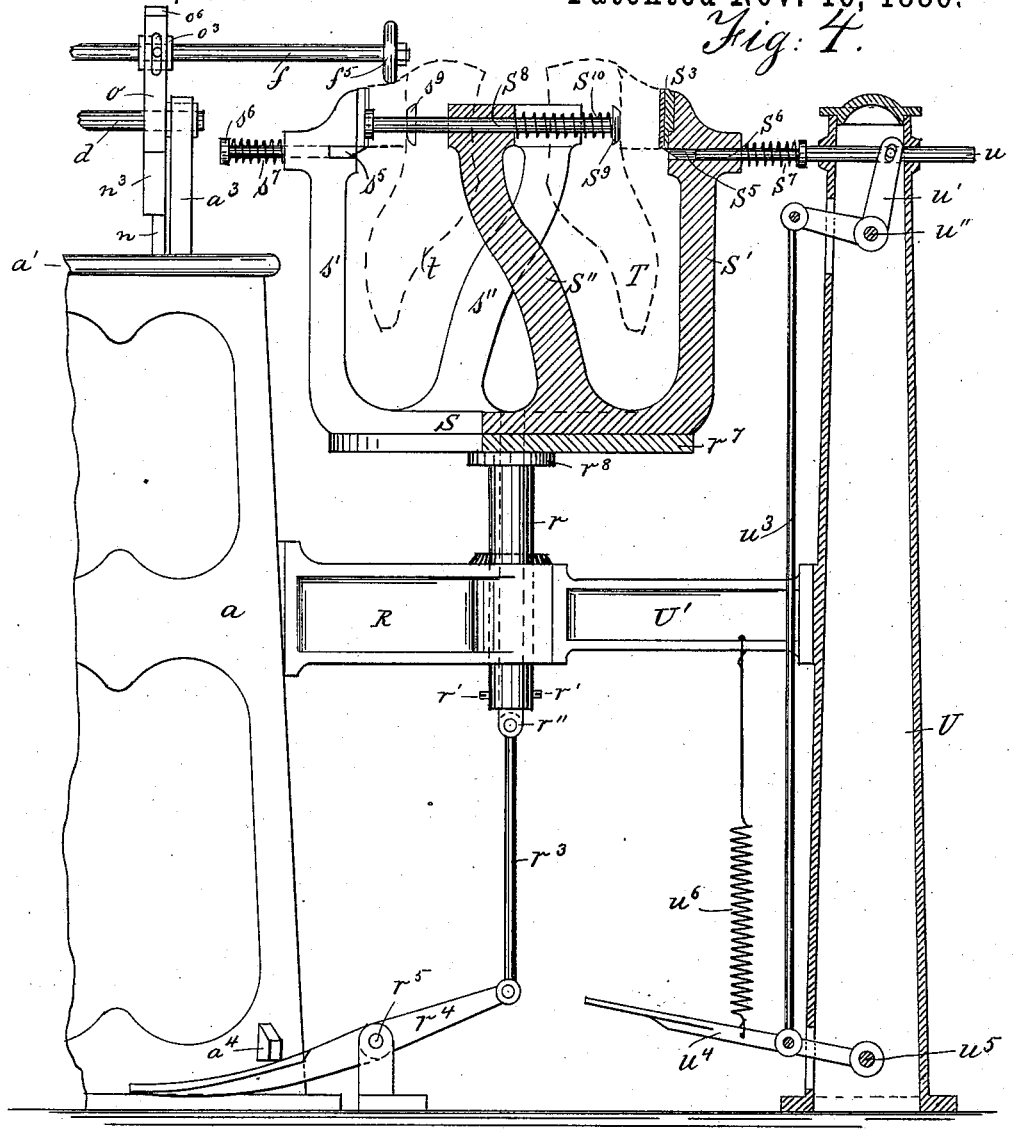
Figure 3:
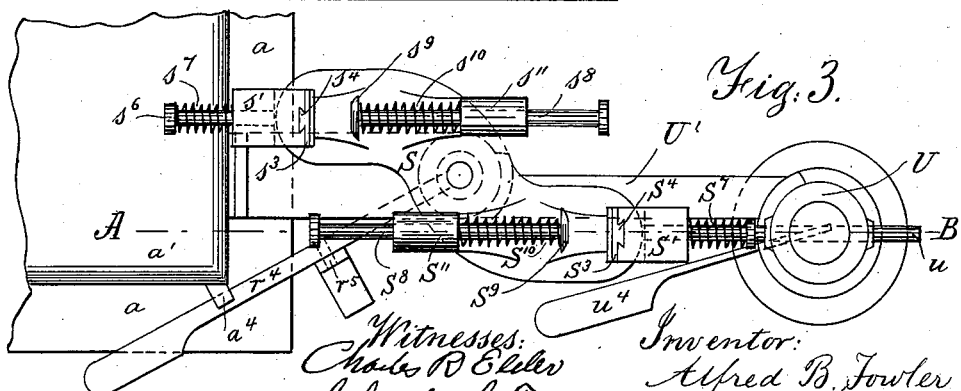

Figure 1 represents a side elevation of the machine and a portion of the jack for holding the shoe. Fig. 2 represents a vertical longitudinal section of the same. Fig. 3 represents a plan view of the duplex jack. Fig. 4 represents a vertical section of the jack on the line A B, shown in Fig. 3. Fig. 5 represents an enlarged section on the line C D, shown in Fig. 2. Fig. 6 represents an enlarged section on the line E F, shown in Fig. 2; and Fig. 7 represents an enlarged section on the line G H, also shown in Fig. 2. Fig. 8 is a cross-section on line I K in Fig. 2.

Similar letters refer to similar parts wherever they occur on the different parts of the drawings.

$a$ represents the frame of the machine, and $a'$ represents its top plate or table-top.

$b$ is the rotary driving-shaft, located in bearings $b'$ $b''$, as shown in Figs. 1 and 2, said shaft being provided with fast and loose pulleys $b^3$ $b^4$, as is usual on driving-shafts. Below the driving-shaft $b$ is located, in stationary bearings $c'$ $c''$, the counter-shaft $c$, as shown in Figs. 1 and 2.

$a''$ and $a^3$ are bearings or standards projecting upward from the table-top $a'$, in the upper ends of which is journaled the rock-shaft $d$, as shown.

To the driving-shaft $b$ is secured the grooved cam $e$, for imparting a reciprocating longitudinal motion to the burnishing or trimming shaft $f$.

$g$ is a pulley secured to driving-shaft $b$, by means of which and a belt, $g'$, and pulley $g''$, secured to counter-shaft $c$, a rotary motion is imparted to the latter.

$h$ is a small pulley secured to driving-shaft $b$, by means of which and a belt, $h'$, a rotary motion is imparted to the pulley $h''$, that is loosely mounted on the counter-shaft $c$. In one piece with the loose pulley $h''$ is made a small pulley, $h^3$, by means of which and a belt, $h^4$, a rotary motion is imparted to the pulley $h^5$, that is loosely mounted on the driving-shaft $b$.

$c^3$ is a collar secured to counter-shaft $c$, between which and the small pulley $g''$ are located the loose pulleys $h''$ $h^3$. To one side of the loose pulley $h^5$ is secured the heart-shaped cam $h^6$, the outline of which is shown in dotted lines in Fig. 6.

$h^7$ and $h^8$ are collars secured to driving-shaft $b$ on opposite sides of loose pulley $h^5$ and cam $h^6$, for holding the latter in their proper positions relative to shaft $b$.

On the rock-shaft $d$ is loosely mounted the sleeve $d'$, (shown in Figs. 2 and 5,) to which sleeve are secured, at a proper distance apart, the levers $d''$ and $d^3$, in the upper ends of which is journaled the spindle $f'$, that is coupled to the rear end of the burnisher or trimmer shaft $f$ by means of the universal joint $f''$. (Shown in Figs. 1, 2, and 5.)

Between the levers $d''$ and $d^3$ is loosely journaled the small pulley $d^4$, to which a rotary motion is imparted from the pulley $c^4$, fast on counter-shaft $c$, by means of the belt $c^5$, as shown in Figs. 1 and 2. Between the levers $d''$ and $d^3$ is secured on the spindle $f'$ a small pulley, $f^3$, to which is imparted a rotary motion from the pulley $d^4$ by means of the belt $f^4$. (Shown in Figs. 1 and 2.) Thus it will be seen that a quick rotary motion is imparted to the burnisher or trimmer shaft $f$ from the driving-shaft $b$ by means of pulleys $g$, $g''$, $c^4$, $d^4$, and $f^3$, and belts $g'$, $c^5$, and $f^4$, as above described.

$f^5$ is the rotary burnisher or trimmer tool secured to the forward end of the shaft $f$, as shown in Figs. 1, 2, and 4. A reciprocatory movement is imparted from the driving-shaft $b$ as follows: The forward end of lever $d^3$ has a sleeved extension, $d^5$, surrounded loosely by a ring, $d^6$, that is prevented from getting detached from said sleeve by means of a collar, $d^7$, secured to said sleeve, as shown in Figs. 1 and 2. To the ring $d^6$ is pivoted, by means of pins or screws $k'$ $k'$, the upper forked end of the rock-lever $k$, the lower end of which is also forked and provided with projections $k''$ $k''$, engaging in the cam-groove $e'$ in the cam $e$, as shown in Figs. 1, 2, and 5.

$k^3$ is a slotted perforation in the rock-lever $k$, and into it projects the fulcrum-pin $l'$, adjustably secured by means of a nut or hand-wheel, $l''$, in the inclined slot-hole $l^3$ in the stationary bracket $l$, attached to the frame $a$ of the machine, as shown in Figs. 1, 2, and 5. It will thus be seen that as the cam $e$ is rotated it causes the lever $k$ to rock on its fulcrum $l'$, and by its connection to the ring $d^5$ a reciprocating motion is imparted to the levers $d''$ $d^3$, sleeve $d'$, spindle $f'$, and burnisher or trimmer tool $f^5$.

By means of the slots $k^3$ $l^3$ in the respective lever $k$ and bracket $l$ the position of the fulcrum-pin $l'$ may be adjusted to vary the amount of reciprocatory motion imparted to the burnisher or trimmer tool, as may be desired, according to the work to be done.

In a machine of this kind it is also necessary that the tool should follow the curvature of the heel of the stationary boot or shoe while held in the jack, and for this purpose I cause the shaft $f$ to oscillate around the axis of the rock-shaft $d$ in the following manner and by the following means: In a groove in the bearing $b'$ is horizontally guided the toothed rack $m$, that is reciprocated in its bearings by means of the rotary heart-shaped cam $h^6$, acting on pins or projections $m'$ $m'$, secured at or near the ends of said rack $m$, as shown in Figs. 1 and 6. The toothed rack $m$ engages in the toothed segment $n'$ of the rock-lever $n$, that is hung on the stationary fulcrum-pin $n''$. (Shown in Figs. 2 and 6.) In its upper end the rock-lever $n$ is also provided with a toothed segment, $n^3$, the teeth of which engage into the segmental teeth $o'$ in the block $o$, secured to the shaft $d$, as shown in Figs. 1, 2, and 6. The block $o$ has a forked opening, $o''$, in which the bearing $o^3$ for the shaft $f$ can move up and down, its motion being limited by means of pins or screws $o^4$ $o^4$, secured to bearing $o^3$ and passing through slot-holes $o^5$ $o^5$ in the sides of block $o$, as shown in Fig. 6. $o^6$ is a cap secured to the upper forked end of block $o$, as shown in said Fig. 6. Back of the block $o$ is secured to rock-shaft $d$ another block, $p$, having a forked opening, $p'$, in which the bearing $p''$ for the rear end of shaft $f$ can move up and down, its motion being limited by means of pins or screws $p^3$ $p^3$, secured to bearing $p''$, and projecting through slot-holes $p^4$ $p^4$ in the sides of block $p$, as shown in Fig. 7. $p^5$ is a cap secured to the upper forked end of block $p$, as shown in Fig. 7.

The burnisher or trimmer tool $f^5$ is held against the heel or other portion of the boot or shoe to be operated upon by pressure from the spring $q$, the lower end of which rests on top of bearing $o^3$, and its upper end held between nuts or projections $q'$ $q'$ on the adjusting-screw $q''$, the lower end of which is screwed into a screw-threaded perforation in the cap $o^6$.

$q^3$ is a knob or handle in the upper end of adjusting-screw $q''$, as shown in Figs. 1, 2, and 6, by which said screw may be adjusted to regulate the pressure of spring $q$ on the adjustable bearing $o^3$, in which the shaft $f$ is mounted.

It will thus be seen that the burnisher or trimmer tool $f^5$ has four distinct motions imparted to it—namely, a rotary motion around its axis, a longitudinal motion forward and back in the direction of its axis, an oscillating motion on the axis of shaft $d$, to follow the curvature of the heel, and a swinging motion on the universal joint $f''$ as a fulcrum, to cause the tool to bear properly against that part of the boot or shoe that is to be burnished or trimmed.

Heretofore burnishing-tools have been heated either by means of a gas or lamp flame, or by a friction device applied to the rotary tool or its shaft. In my present invention I dispense entirely with such heating devices, and I obtain the proper heat on the burnisher-tool simply by frictional rotation and pressure of the tool against the article to be burnished, such as the heel or sole edge of the boot or shoe. Such friction and heat on the burnisher-tool are adjusted to a nicety by the spring $q$ and its regulating device, as described.

The improved jack for holding the boots or shoes while being burnished or trimmed is carried out as follows, and fully shown in Figs. 1, 2, 3, 4, and 8: To the front of frame $a$ is secured a suitable arm or bracket, R, having a bored-out vertical perforation in its outer end, in which is guided the cylinder or rod $r$, that is free to turn around its axis, as well as to be up and down adjustable in said bracket R. To the lower end of the cylinder $r$ is jointed, by means of screws or pins $r'$ $r'$, the swivel-piece $r''$, having hinged to it the upper end of the connecting-rod $r^3$, the lower end of which is hinged to the treadle-lever $r^4$, that is hung on the fulcrum $r^5$, as shown in Figs. 1, 3, and 4. $a^4$ is a stationary locking projection or lip, or equivalent device, below which the forward end of the treadle-lever $r^4$ is moved, so as to hold the cylinder $r$ and the jack above it in its highest position when the burnishing or trimming of the boot or shoe is being done, as shown in Figs. 1, 3, and 4. When in such position, the cylinder $r$ must be prevented from turning around, and therefore I make on the interior bored-out portion of the bracket R a pair of diametrically-opposite longitudinal grooves, R' R', into which fits one or two pins, lugs, or projections, $r^6$. (Shown in Figs. 2 and 8.) The grooves R' R' do not extend entirely through the whole depth of bracket R, but terminate at a proper distance from the top thereof, as shown in Fig. 2, the bottoms of said grooves serving as stops to limit the upward motion of the cylinder $r$ and the jack. In one piece with the upper end of cylinder $r$, or attached to it, is a plate, $r^7$, having a hub, $r^8$, on its under side, which hub is adapted to rest on the top of bracket R when the jack is lowered and the treadle-lever $r^4$ released from the lip $a^4$, and in such position the projections $r^6$ come below the bracket R, thus permitting the cylinder $r$ to be turned freely around its axis. The lower ends of the grooves R' R' are preferably made flaring, as shown in Fig. 8, to facilitate the projections $r^6$ entering the grooves R' R', and thus permit the jack to be raised to its proper working position, even if it should not be accurately in such position at the beginning of its upward motion.

To the plate $r^7$ is secured the jack-plate S, from which extend upwardly on one side of the center of the cylinder $r$ a pair of arms, S' and S'', the former serving as a rest for the heel top-lift of the shoe, having for this purpose temporarily secured to it the detachable heel-top-lift plate $S^3$, the rear of which is provided with a dovetailed projection, $S^4$, adapted to fit into a corresponding dovetailed recess in the upper end of the arm S', as shown in Figs. 3 and 4. In a recess in the arm S' is arranged the breasting-knife $S^5$, having an outwardly-projecting shank, $S^6$, provided with a spiral spring, $S^7$, for automatically holding the breasting-knife $S^5$ out of operative position when not used. The arm S'' has a horizontal perforation in its upper end, in which is located the horizontally-adjustable clamping-bar $S^8$, having a head, $S^9$, in its forward end adapted to be forced against the insole of the boot or shoe by means of a coiled spring, $S^{10}$, or equivalent device.

I do not wish to confine myself to any particular mechanism for clamping the boot or shoe in position, as this may be done in any of the well-known ways without departing from the essence of my invention.

$s'$ and $s''$ are corresponding upwardly-projecting arms arranged on plate S on the other side of the center of the cylinder $r$, as shown in Figs. 1, 2, 3, and 4, with corresponding parts $s^3$, $s^4$, $s^5$, $s^6$, $s^7$, $s^8$, $s^9$, and $s^{10}$.

T and $t$ (shown in dotted lines in Figs. 1, 2, and 4) represent the boots or shoes held, respectively, on the duplex jack between the parts $S^3$ $S^9$ and $s^3$ $s^9$, as shown in Fig. 4.

The breasting-knives $S^5$ $s^5$ are to be provided with the usual guards, the latter being, however, not shown in the drawings.

The mechanism for operating the breasting-knives $S^5$ $s^5$ is carried out as follows, and fully shown in Figs. 3 and 4.

U is a vertical post firmly secured to the floor or otherwise, as may be desirable, and it is also secured about midway between its upper and lower ends to the bracket R by means of the horizontal beam or brace U', as shown. In horizontal bearings or perforations in the upper end of post U is arranged the pressure-pin $u$, that is pivoted to one end of a bell-crank lever, $u'$, pivoted to the post U at $u''$, and having hinged to its other end the downwardly-projecting connecting-rod $u^3$, the lower end of which is hinged to the treadle-lever $u^4$, that is hung at $u^5$ to the lower end of post U.

$u^6$ is a spiral spring attached to treadle-lever $u^4$ and to beam or brace U', for automatically returning the bell-crank lever $u'$ and its pressure-pin $u$ to the position shown in Fig. 4 as soon as the foot-pressure on the treadle $u^4$ is relieved.

The operation is as follows: The jack S is lowered by releasing treadle-lever $r^4$ from projection $a^4$, causing hub $r^8$ to rest on bracket R, after which a boot or shoe is placed and secured between top-lift rest $S^3$ and head $S^9$, and the duplex jack swung to the position shown in Fig. 3, and is then raised and locked in position shown in Fig. 4 by the influence of treadle $r^4$, locking projection $a^4$, locking-pins $r^6$, and grooves R', as shown in Fig. 2. The shoe is then ready to be breasted, which is accomplished by the operator depressing the treadle $u^4$, causing the pressure-bar $u$ to act on the rear end of the shank $S^6$ of the breasting-knife $S^5$, causing the latter to move inward, and thus to cut off the face or breast of the heel. After this is done the operator releases his pressure on treadle $u^4$, the spring $u^6$ causes bar $u$ to be drawn back, and spring $S^7$ draws the breasting-knife back to its normal position. (Shown in Fig. 4.) The jack is now again lowered and swung half a revolution around its axis, and a boot or shoe secured between the parts $s^3$ $s^9$, after which the jack is raised as before, the second shoe is breasted, and the first shoe-heel is then in a position to be trimmed or burnished, being centrally in a line with the shaft $f$. The machine is set in operation, causing the tool $f^5$ to revolve, move forward and back in the direction of its axis, oscillate around the shaft $d$, and yield against the influence of spring $q$, so as to bear against all parts of the curved portion of the heel, the heat on the burnisher being produced by the direct frictional contact between it and the article operated on, as described. After the shoe is burnished or trimmed the jack is again lowered, the finished shoe removed, another one put in its place, the jack turned half a revolution around its vertical axis, after which it is raised and locked in position, as shown in Fig. 4—one shoe breasted and the other burnished, and so on.

During the operation of breasting and trimming or burnishing of the shoe the latter remains stationary on the jack.

I have shown in the drawings the machine as used for burnishing heels; but it can equally well be used for trimming or burnishing the sole edges of boots or shoes.

Having thus fully described the nature, construction, and operation of my invention, I wish to secure by Letters Patent, and claim—

1. In a burnishing or trimming machine, the rotary driving-shaft $b$ and its pulley $h$, with belt $h'$, leading to pulley $h''$ on counter-shaft $c$, the pulley $c^4$ on the latter, with belt $c^5$, leading to pulley $d^4$, mounted on rock-shaft $d$, the belt $f^4$, pulley $f^3$, and shaft $f'$, universally jointed to the burnisher or trimmer shaft $f$, for the purpose of imparting a rotary motion to said shaft $f$ and its burnisher or trimmer tool $f^5$, as herein set forth and described.

2. The herein-described device for imparting an oscillating motion to the burnisher or trimmer shaft $f$, consisting of the rotary driving-shaft $b$ and its cam $h^6$, the reciprocating rack $m$, the segmental lever $n$, having teeth $n'$, adapted to engage in the toothed rack $m$, and teeth $n^3$, meshing in the teeth $o'$ on block $o$, secured to shaft $d$, the block $p$, also secured to said shaft $d$, both of said blocks $o$ $p$ having respective bearings $o^3$ $p''$, in which the shaft $f$ is journaled, as and for the purpose set forth.

3. In a burnishing or trimming machine, the herein-described device for imparting a longitudinal reciprocating motion to the shaft $f$, consisting of the rotary shaft $b$ and its grooved cam $e$, the rocking lever $k$, pivoted at $l'$, the levers $d''$ $d^3$, mounted on sleeve $d'$, longitudinally movable on shaft $d$, the shaft or spindle $f'$, journaled in the levers $d''$ $d^3$, and connected to the burnisher or trimmer shaft $f$, as and for the purpose set forth.

4. In a burnishing or trimming machine, the rock-shaft $d$, having secured to it the blocks $o$ $p$, the shaft $f$, journaled in bearings $o^3$ $p''$, adapted to slide in the respective blocks $o$ $p$, and adjustable spring $q$, for automatically pressing the rotary tool $f^5$ against the article to be operated upon, as herein set forth and described.

5. The herein-described duplex rotary or reversible jack, consisting of two pairs of arms, $S'$ $S''$ $s'$ $s''$, with clamping and rest devices, as described, said arms being secured to a vertically-adjustable post, $r$, adapted to slide up and down and turn in a stationary bearing, $R$, and provided with a treadle and locking mechanism, in a manner and for a purpose as herein set forth and described.

6. In a burnishing or trimming machine, the duplex jack having the upright supporting-arms $S'$ $s'$ and sliding breasting-knives $S^5$ $s^5$, located in the upper ends of said arms $S'$ $s'$, in combination with the stationary post U, the pressure-rod $u$, arranged in bearings in the same and adapted to be operated by means of treadle $u^4$, rod $u^3$, bell-crank lever $u'$, and spring $u^6$, as and for the purpose set forth.

7. In a burnishing or trimming machine, the rotary shaft $b$ and its cam $c$, in combination with the slotted lever $k$, slotted bracket $l$, and adjustable fulcrum-pin $l'$, for the purpose of regulating the longitudinal reciprocating motion of shaft $f$, as herein set forth and described.

In testimony whereof I have signed my name to this specification, in the presence of two subscribing witnesses, on this 21st day of July, A. D. 1886.

ALFRED B. FOWLER.

Witnesses:
CHARLES E. ATWOOD,
ARTHUR O. FULLER.